(12) United States Patent
Wagoner et al.

(10) Patent No.: US 8,576,598 B2
(45) Date of Patent: Nov. 5, 2013

(54) SYSTEMS, METHODS, AND APPARATUS FOR CONVERTING DIRECT CURRENT (DC) POWER TO ALTERNATING CURRENT (AC) POWER

(75) Inventors: Robert Gregory Wagoner, Roanoke, VA (US); Anthony Galbraith, Wirtz, VA (US)

(73) Assignee: General Electric Company, Schenectady, NY (US)

(*) Notice: Subject to any disclaimer, the term of this patent is extended or adjusted under 35 U.S.C. 154(b) by 770 days.

(21) Appl. No.: 12/505,802

(22) Filed: Jul. 20, 2009

(65) Prior Publication Data
US 2011/0013433 A1   Jan. 20, 2011

(51) Int. Cl.
*H02M 7/537* (2006.01)

(52) U.S. Cl.
USPC ............... 363/131; 363/39; 363/95; 363/123; 363/132

(58) Field of Classification Search
USPC ............... 363/95, 123, 222, 39–43, 131, 132; 307/82; 323/222
See application file for complete search history.

(56) References Cited

U.S. PATENT DOCUMENTS

| | | | |
|---|---|---|---|
| 4,390,940 A | 6/1983 | Corbefia et al. | |
| 6,058,035 A | 5/2000 | Madenokouji et al. | |
| 6,194,885 B1 * | 2/2001 | Oshima | 323/285 |
| 6,262,558 B1 | 7/2001 | Weinberg | |
| 6,291,764 B1 | 9/2001 | Ishida et al. | |
| 6,323,626 B1 | 11/2001 | Raiser | |
| 6,369,461 B1 | 4/2002 | Jungreis et al. | |
| 6,809,942 B2 | 10/2004 | Madenokouji et al. | |

(Continued)

FOREIGN PATENT DOCUMENTS

| | | |
|---|---|---|
| CN | 201118437 Y | 9/2008 |
| CN | 101309012 A | 11/2008 |
| CN | 101355321 A | 1/2009 |
| EP | 947904 B1 | 10/2003 |

OTHER PUBLICATIONS

DC to DC Converter, Wikipedia: The Free Encyclopedia, Jun. 2, 2009, <http://en.wikipedia.org/wiki/DC_to_DC_converter>.

(Continued)

*Primary Examiner* — Adolf Berhane
*Assistant Examiner* — Yemane Mehari
(74) *Attorney, Agent, or Firm* — Sutherland Asbill & Brennan LLP

(57) ABSTRACT

Embodiments of the invention can provide systems, methods, and apparatus for converting direct current (DC) power to alternating current (AC) power. According to one embodiment, a system for converting DC power to AC power can be provided. The system can include a DC power source that provides a first DC power signal to a converter. Coupled to the converter can be a controller for transforming the first DC power signal into a plurality of AC power signals. The controller can also phase shift at least one of the plurality of AC power signals and combine the phase shifted AC power signal with at least one of the other of the plurality of AC power signals to provide a second DC power signal. The controller can also convert the second DC power signal to an AC power signal.

20 Claims, 5 Drawing Sheets

(56) References Cited

U.S. PATENT DOCUMENTS

| | | | |
|---|---|---|---|
| 6,921,985 B2 | 7/2005 | Janssen et al. | |
| 6,952,353 B2 | 10/2005 | Yan et al. | |
| 7,016,205 B2 | 3/2006 | Steigerwald et al. | |
| 7,138,730 B2 * | 11/2006 | Lai | 307/82 |
| 7,589,986 B2 * | 9/2009 | Bocchiola | 363/98 |
| 8,009,446 B2 * | 8/2011 | Chou et al. | 363/41 |
| 2005/0284673 A1 | 12/2005 | Nakazawa et al. | |
| 2008/0007121 A1 | 1/2008 | Erdman et al. | |
| 2008/0062724 A1 | 3/2008 | Feng et al. | |
| 2011/0011842 A1 * | 1/2011 | Thomas | 219/130.21 |

OTHER PUBLICATIONS

Cullen, R., What is Maximum Power Point Tracking (MPPT) and How Does It Work?, Blue Sky Energy, Inc., <www.blueskyenergyinc.com>.

Disclosure Statement Under 37 C.F.R. §1.56 as filed Jul. 24, 2009.

Non-final Office Action for U.S. Appl. No. 12/505,858 mailed Aug. 26, 2010.

First Office Action for Chinese Application No. 201010240851.5 dated Sep. 26, 2012.

* cited by examiner

SYSTEMS, METHODS, AND APPARATUS FOR CONVERTING DIRECT CURRENT (DC) POWER TO ALTERNATING CURRENT (AC) POWER

FIELD OF THE INVENTION

The invention relates to power conversion, and more specifically, to systems, methods, and apparatus for converting direct current (DC) power to alternating current (AC) power.

BACKGROUND OF THE INVENTION

A direct current (DC) power source, such as a fuel cell or photovoltaic cell, typically can be used as a source of electrical power. While these DC power sources provide a source of power, the power these sources provide requires conditioning prior to being electrically coupled to a load. For example, because many power applications require a stable source of alternating current (AC) power and not DC power to operate, power conversion systems have been adapted to modify the power being supplied from DC power sources.

In modifying the DC power being provided, power conversion systems can employ switching type electronic systems. To condition the DC power provided by DC power sources, these switching type electronic systems can be rapidly switched on and off. Such rapid switching though, can cause the current being drawn from the DC power source to vary, resulting in an AC ripple current. Such AC ripple currents result in conductive losses in the DC power source and decrease the system's efficiency. Conventional systems have employed filters and/or modified the operation of their electronic systems to limit the AC ripple current. These modifications, however, increase component cost and can diminish a system's life span.

Thus, there is a need for a power conversion system with a reduced AC ripple current as part of systems, methods, and apparatus for converting DC power to AC power. There is also a need for systems, methods, and apparatus for converting direct current (DC) power to alternating current (AC) power

BRIEF DESCRIPTION OF THE INVENTION

Certain embodiments of the invention can address some or all of the needs described above. Certain embodiments of the invention are directed to systems, methods, and apparatus for converting direct current (DC) power to alternating current (AC) power. Certain other embodiments of the invention can provide a power conversion system with a reduced AC ripple current as part of systems, methods, and apparatus for converting DC power to AC power. According to one embodiment, a method for converting DC power to AC power can be provided. The method can include receiving, by a converter, a first DC power signal from at least one DC power source. The method can also include transforming the first DC power signal into a plurality of AC power signals. The method can further include shifting at least one of the plurality of AC power signals by a predetermined phase amount relative to at least one of the other of the plurality of AC power signals. Moreover, the method can include combining the phase shifted AC power signal with at least one of the other of the plurality of AC power signals to provide a second DC power signal. The method can also include converting the second DC power signal to an AC power signal.

According to another embodiment of the invention, a system for converting DC power to AC power can be provided. The system can include at least one DC power source electrically coupled to a converter. The at least one DC power source can provide a first DC power signal to the converter. Coupled to the converter can be at least one controller. The controller can be operable to transform the first DC power signal into a plurality of AC power signals and to shift at least one of the plurality of AC power signals by a predetermined phase amount relative to at least one of the other of the plurality of AC power signals. Furthermore, the controller can be operable to combine the phase shifted AC power signal with at least one of the other of the plurality of AC power signals to provide a second DC power signal. The controller can also be operable to convert the second DC power signal to an AC power signal.

According to yet another embodiment of the invention, an apparatus for converting DC power to AC power can be provided. The apparatus can include at least one inductor electrically coupled to a converter and operable to receive a first DC power signal. The apparatus can also include at least one switching component electrically coupled to the at least one inductor. The apparatus can further include a controller electrically coupled to the switching component and operable to transform the first DC power signal into a plurality of AC power signals. The controller can also be operable to shift, via the at least one switching component, at least one of the plurality of AC power signals by a predetermined phase amount relative to at least one of the other of the plurality of AC power signals. The controller can also combine the phase shifted AC power signal can be combined with at least one of the other of the plurality of AC power signals to provide a second DC power signal. The controller can also convert the second DC power signal to an AC power signal.

Other embodiments and aspects of the invention will become apparent from the following description taken in conjunction with the following drawings.

BRIEF DESCRIPTION OF THE DRAWINGS

Figure 1:
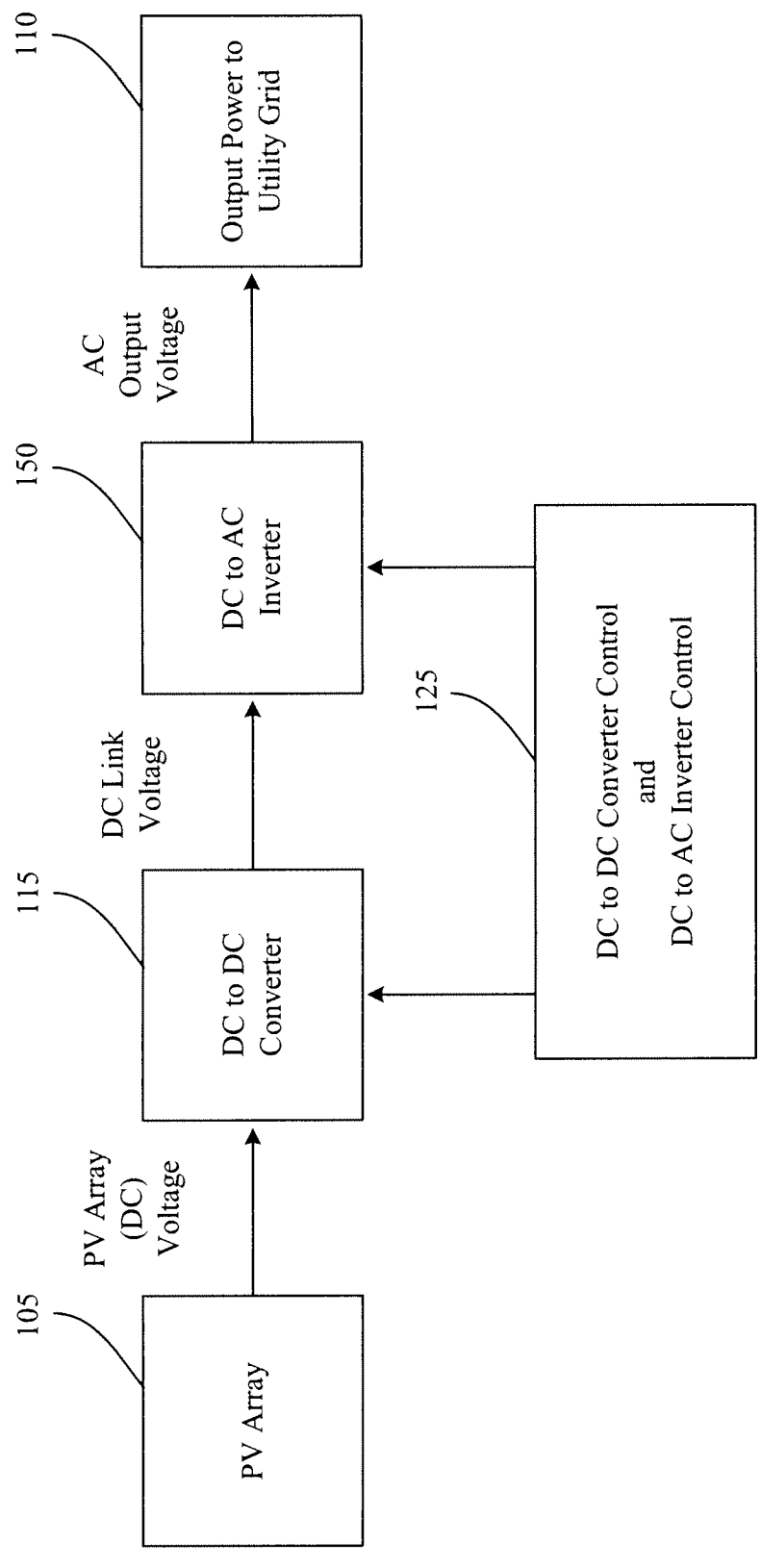

Having thus described the invention in general terms, reference will now be made to the accompanying drawings, which are not necessarily drawn to scale, and wherein:

FIG. 1 illustrates a conventional system for converting direct current (DC) power to alternating current (AC) power.

Figure 2:
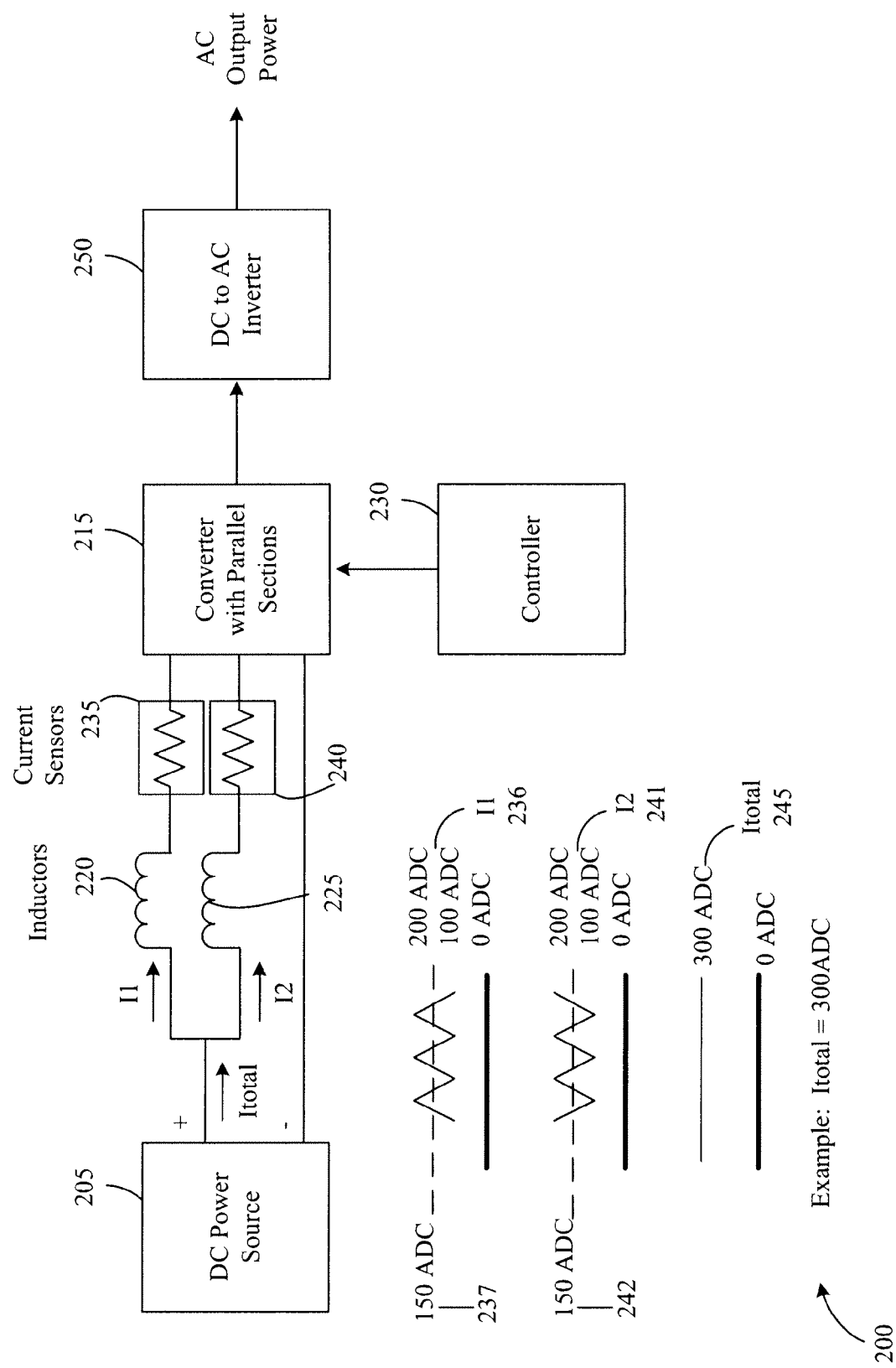

FIG. 2 illustrates an exemplary system for converting DC power to AC power according to one embodiment of the invention.

Figure 3:
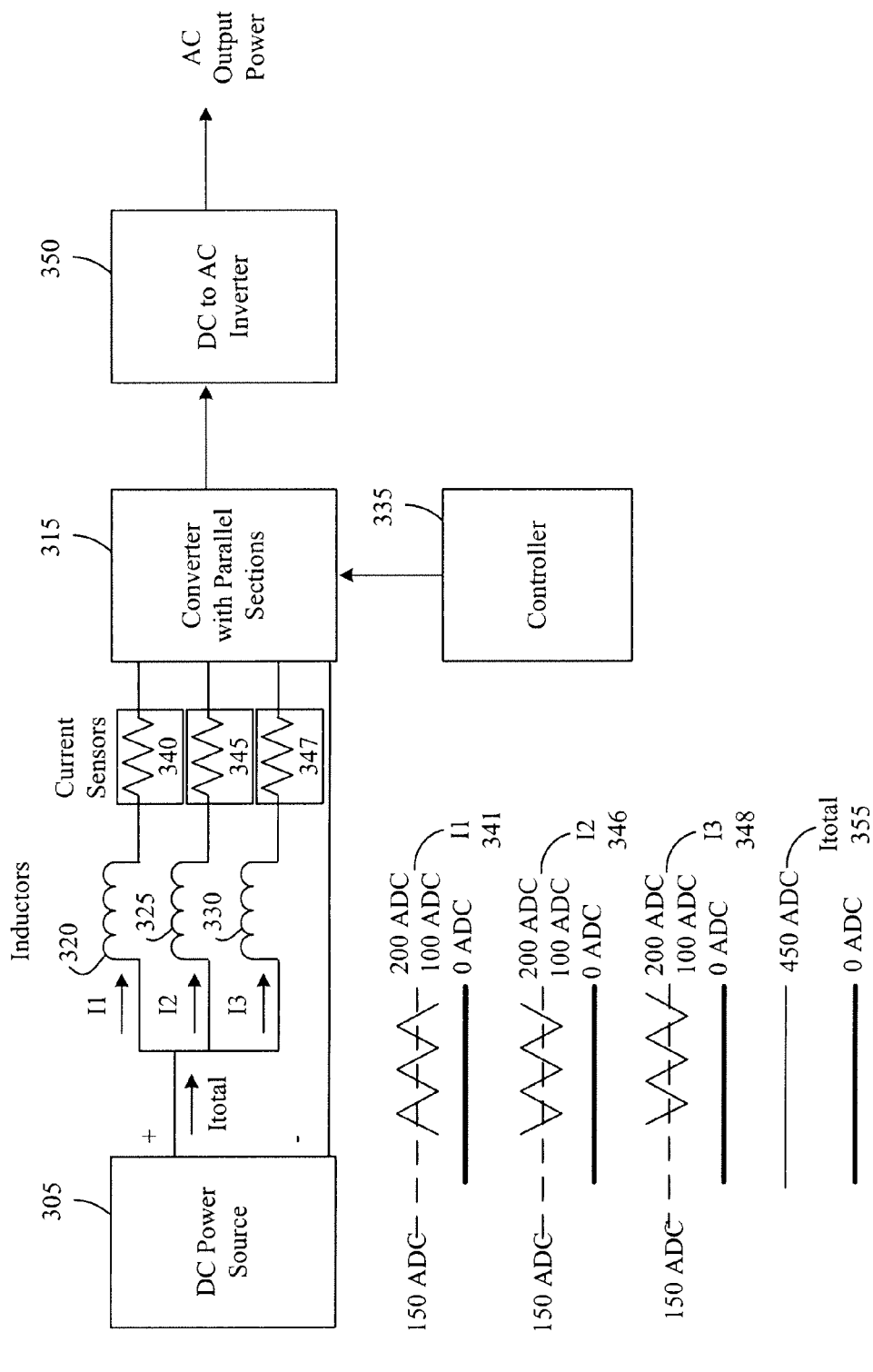

FIG. 3 illustrates an exemplary system for converting DC power to AC power according to another embodiment of the invention.

Figure 4:
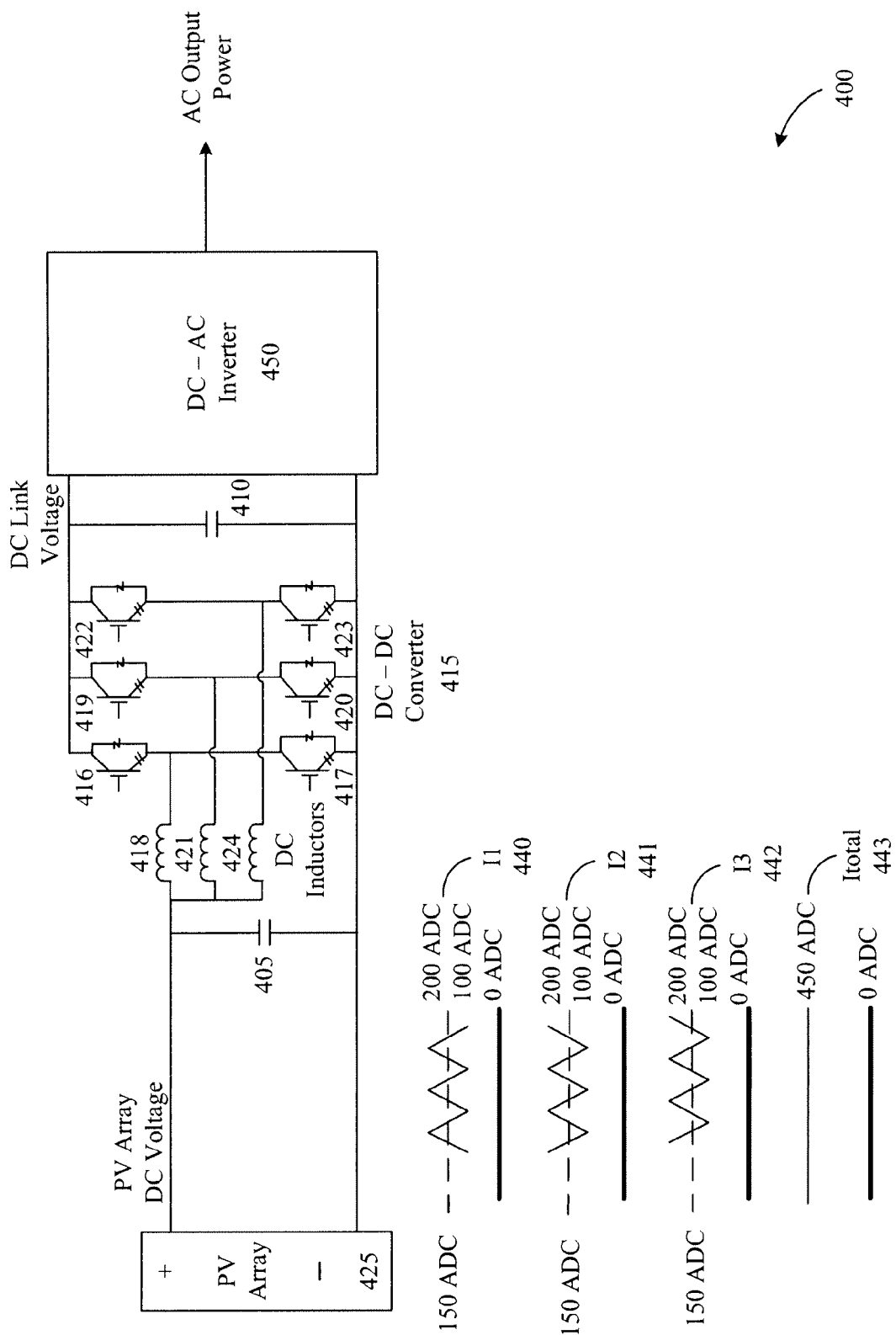

FIG. 4 illustrates an exemplary system for converting DC power to AC power according to another embodiment of the invention.

Figure 5:
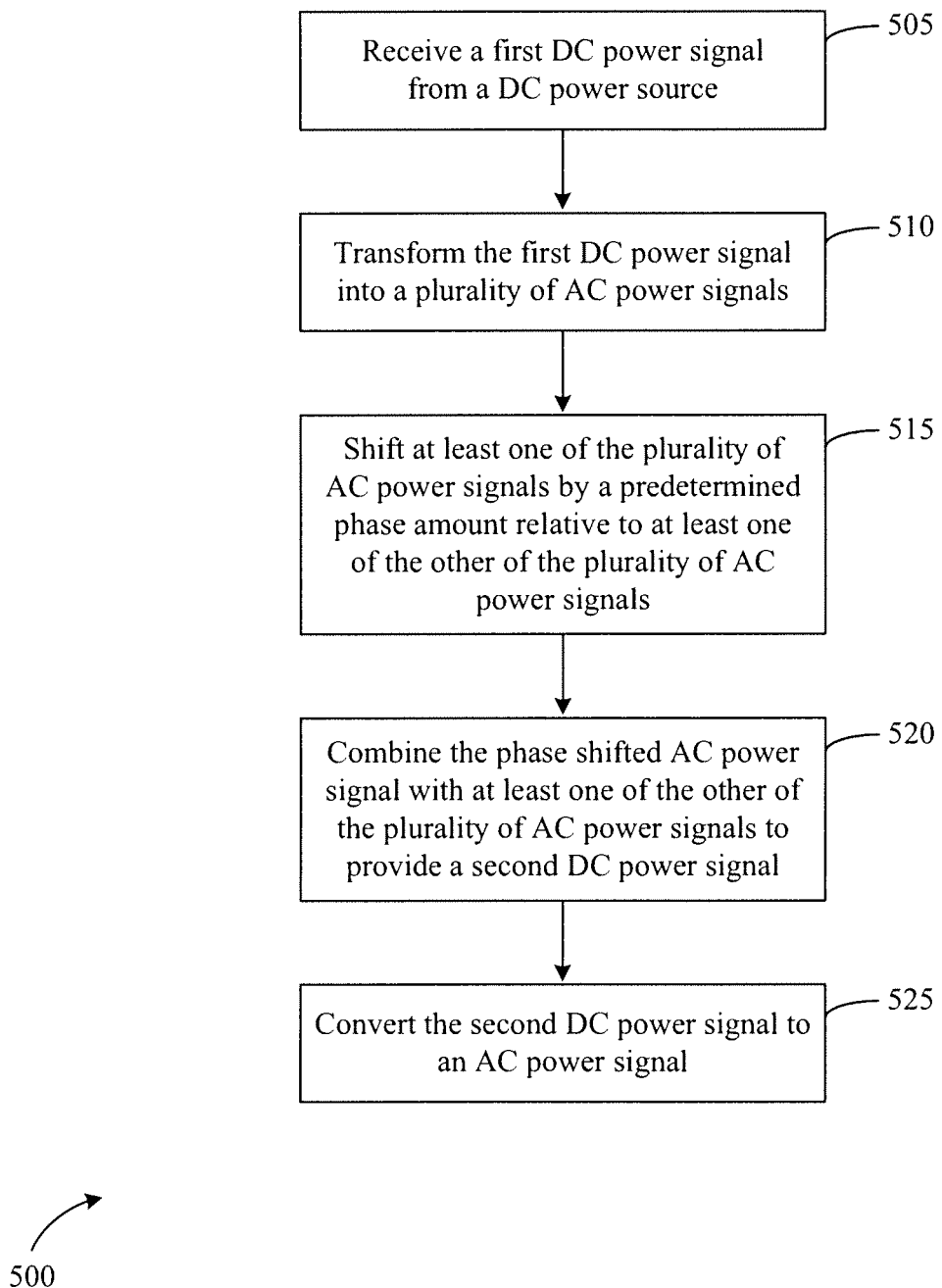

FIG. 5 illustrates an exemplary method for converting DC power to AC power according to one embodiment of the invention.

DETAILED DESCRIPTION OF THE INVENTION

The invention now will be described more fully hereinafter with reference to the accompanying drawings, in which example embodiments of the invention are shown. This invention may, however, be embodied in many different forms and should not be construed as limited to the example embodiments set forth herein; rather, these embodiments are provided so that this disclosure will convey the scope of the invention to those skilled in the art. Like numbers refer to like elements throughout.

FIG. 1 illustrates a conventional system 100 for converting direct current (DC) power to alternating current (AC) power. In system 100, a photovoltaic array 105 can be provided as a source of DC power. Although photovoltaic array 105 can tap into an almost inexhaustible source of energy, photovoltaic array 105, like other DC power sources including fuel cells, batteries, and the like, can not be electrically coupled directly to a load, such as utility grid 110. Rather, because photovoltaic array 105 provides DC-type power that can vary with local conditions, the DC power output of photovoltaic array 105 should be stabilized and converted to AC power prior to being incorporated into or otherwise connected to the utility power grid 110. In system 100, these operations can be performed by electrically coupling photovoltaic array 105 to DC-to-DC converter 115 and DC-to-AC inverter 120.

The combination of DC-to-DC converter 115 and DC-to-AC inverter 120 can convert the electrical energy from photovoltaic array 105 to a relatively stable and reliable source of AC power. More specifically, DC-to-DC converter 115 can be electrically coupled to photovoltaic array 105 and can condition the DC power provided from photovoltaic array 105 to make the DC voltage more consistent. DC-to-AC inverter 120 can convert the conditioned DC power to AC power before providing the regulated power to a load, such as utility power grid 110.

In system 100, DC-to-DC converter 115 can be a switching type regulator that is operable to condition the DC voltage using a form of pulse width modulation control, which can be provided by controller 125. Because controller 125 repetitively switches or toggles some portion of DC-to-DC converter 115 between open and closed positions to condition the DC power, DC-to-DC converter 115 can draw an AC ripple current from photovoltaic array 105 and can provide an AC ripple current to DC-to-AC inverter 120. Drawing a ripple current from photovoltaic array 105, though, may be undesirable as it can increase the effective current drawn from the cell, which increases the resistive losses in the cell and decreases the cell's efficiency. Similarly, providing an AC ripple current to DC-to-AC inverter 120 may also be undesirable as it can introduce instabilities into system 100.

Consequently, in conventional systems like system 100, the AC ripple current has been reduced through filtering and frequency modification. More particularly, because AC ripple current is a high frequency signal, capacitors have been employed to filter such currents out of the system. Switching frequencies have also been increased to reduce the AC ripple current. Increasing the switching frequencies in DC-to-DC converter 115, however, can result in increased switching losses. And, while filtering the AC ripple current decreases the amount of AC ripple current, filtering can result in conductor and dielectric losses. Increased power losses can harm the efficiency of the conventional system 100 and can result in increased costs. It is sometimes desirable to reduce these costs and inefficiencies associated with conventional system 100.

FIG. 2 illustrates an exemplary system 200 for converting DC power to AC power according to one embodiment of the invention. System 200 can include a DC-to-DC converter 215 and DC-to-AC inverter 250, or collectively the apparatus. DC-to-AC inverter 250 can receive DC power from DC-to-AC inverter 250 and can convert the DC power to AC power before providing the AC power to a load, such as utility power grid 110. System 200 can also include DC power source 205, which can be any suitable DC power source such as a photovoltaic cell, a fuel cell, an array of such cells, a battery, or the like.

DC-to-DC converter 215 can include parallel input sections each of which can be coupled to a respective inductor. In exemplary system 200, DC-to-DC converter 215 can include two parallel input sections coupled to respective inductors 220 and 225. Inductors 220 and 225 can be operable to receive DC power from DC power source 205 and to provide this DC power to each input section of DC-to-DC converter 215. Once receiving the DC power from inductors 220 and 225, DC-to-DC converter 215 can be adapted to condition the DC power to reduce the amount of AC ripple current drawn from DC power source 205 and provided to DC-to-AC inverter 250.

In one embodiment, DC-to-DC converter 215 can be adapted through controller 230 to interleave the current associated with the DC power at each input stage to reduce the AC ripple current. In other words, controller 230 can be adapted to modify one or more operating characteristics of DC-to-DC converter 215. Controller 230 can be implemented using hardware, software, or a combination thereof for performing the functions described herein. By way of example, controller 230 can be a processor, an ASIC, a comparator, a differential module, or other hardware means. Controller 230 can also comprise software or other computer-executable instructions that may be stored in a memory and may be executable by a processor or other processing means.

In the exemplary embodiment, duty cycle control can be provided by controller 230 one or more input stages of DC-to-DC converter 215. Duty cycle control relates to the ratio of a switching mechanism's on and off time when the total cycle time is fixed. In other embodiments of the invention, frequency control can be employed. Unlike duty cycle control, when using frequency control, the total cycle time can vary, whereas the ratio of the switching mechanism's on and off time can remain fixed. In other embodiments of the invention, a combination of duty cycle control and frequency control can be employed so that both the total cycle time and the ratio of on and off time can vary.

When using duty cycle control, controller 230 can interleave the DC power at each input stage by phase shifting the duty cycles applied to each input stage. More particularly, by altering the duty cycle at the second input stage of DC-to-DC converter 215 in relation to the first input stage, the ripple current of the DC power provided to the second input stage of DC-to-DC converter 215 can be phase shifted about 180 degrees in relation to the DC power provided to the first input stage of DC-to-DC converter 215. Once the ripple current of the DC power at each stage of DC-to-DC converter 215 is shifted in phase, the DC power at each stage can be combined, such as through a rectifier circuit coupled to a capacitor bank, or other circuit for combining multiple sources of DC power. By combining the phase-shifted ripple currents in this way, the total AC ripple current can be reduced due to the opposing phases of the currents provided to each stage of DC-to-DC converter 215. In other embodiments of the invention, the circuit for combining multiple sources of the DC power may include one or more diodes as part of one or more DC-to-DC boost converter circuits. These DC-to-DC boost converter circuits may include active switches such as IGBTs or MOSFETS, which may also include anti-parallel diodes.

To illustrate, DC-to-DC converter 215 can be electrically coupled to current sensors 235 and 240. At 236, the current provided to the first input stage of DC-to-DC converter 215 as measured by current sensor 235 is illustrated. At 241, the current provided to the second input stage of DC-to-DC converter 215 as measured by current sensor 240 is illustrated. When comparing the current at 236 with the current at 241, the current provided to the second input stage of DC-to-DC converter 215 as illustrated at 241 can be shifted about 180 degrees in phase when compared to the current provided to the first input stage. When current from the first input stage of DC-to-DC converter 215 is combined with current from the second input stage of DC-to-DC converter 215, their phases can offset. In other words, as the magnitude of the first current increases above about the 150 Amp DC offset shown at 237, the magnitude of the second current decreases by approximately the same amount below about the 150 Amp DC offset shown at 242. Thus, when the two currents are combined, the AC ripple current associated with the varying phases can be reduced, and only the DC offset voltage for both stages can remain as shown at 245.

It will be appreciated that in some embodiments, DC-to-DC converter 215 can be adapted to include additional input stages. Such adaptations may be made for reasons related to efficiency, design constraints, code requirements, or the like. FIG. 3 illustrates an exemplary system 300 for converting DC power to AC power including DC-to-DC converter 315, which can be adapted to include three input stages.

Similar to system 200, system 300 can include a DC power source 305 and a DC-to-AC inverter 350. DC-to-DC converter 315, being adapted to include three input stages, can be electrically coupled to inductors 320, 325, and 330. Controller 335 can be operable to control DC-to-DC converter 315 to reduce the AC ripple current, such as through interleaving and duty cycle control. In system 300, current sensors 340, 345, and 347 can measure the current being provided to each parallel input stage of DC-to-DC converter 315.

As illustrated at 341, 346, and 348, the current being provided to each input stage can be interleaved and the AC ripple current can be reduced. In system 300, the current provided to each stage can be phase shifted by about 120 degrees in relation to the current provided to the preceding stage. The three currents from each parallel input stage of DC-to-DC converter 315 can be combined to form a second DC power signal, and in part due to the varying phases of these three currents, the AC ripple current can be further reduced as shown at 355.

The example elements of FIG. 2 and FIG. 3 are shown by way of example, and other system and apparatus embodiments can have fewer or greater numbers of elements, and such elements can be arranged in other configurations in accordance with other embodiments of the invention. That is, while the embodiments discussed above relate to converters having two and three parallel input sections, it will be appreciated that more parallel input sections can be employed. When multiple input sections are employed, the DC power provided to each parallel input stage of an associated converter can be phase shifted by a predetermined amount. For example, in some embodiments, for every n parallel input stages in a converter, the DC power provide to each parallel input stage of the converter can be phase shifted about 360/n degrees.

Furthermore, in both embodiments described above, exemplary values were selected to reduce the AC ripple current in the DC power source so that the total current was relatively constant. It will be appreciated that in many embodiments, a relatively small amount of AC ripple current may persist. In some embodiments, the amount of AC ripple current that persists could relate to the number of parallel sections in the converter. In other embodiments, the amount of AC ripple current that persists could relate to whether the converter is operable to boost the DC power provided by DC power source 205 from a first voltage to a second voltage. In such instance where the AC ripple current persists, a filter can be employed in combination with the switching components for reducing the total AC ripple current.

FIG. 4 illustrates a system 400 for converting DC power to AC power employing filters 405 and 410 in combination with a plurality of switching components comprising a DC-to-DC converter 415 and coupled to a DC-to-AC inverter 450, or collectively the apparatus. DC-to-DC converter 415 comprises three parallel input stages coupled to three parallel inductors. The first input stage comprises insulated gate bipolar transistor (IGBT) 416 coupled to IGBT 417 and inductor 418. The second input stage comprises IGBT 419 coupled to IGBT 420 and inductor 421. The third input stage comprises IGBT 422 coupled to IGBT 423 and inductor 424. Inductors 418, 421, and 424 can be coupled in parallel to a DC power source, such as photovoltaic array 425.

It will be appreciated that although IGBT switching mechanisms are shown in the exemplary embodiment, other switching mechanisms can also be used. Other switching mechanisms that can be used include, but are not limited to, the following: a MOSFET, a bipolar junction transistor, or a semiconductor switch.

A controller like controller 230 in system 200, can be adapted to operate the IGBTs of DC-to-DC converter 415 and to phase shift the DC power provided to each parallel input stage through inductors 418, 421, and 424. The duty cycle of the IGBTs is related to the input and output voltages, and may vary between 0% and 100%. More specifically, in one embodiment, the IGBTs can be switched on and off at about 50% duty cycle to provide a desired response. For example, IGBT 417 can be switched on at the leading edge of the about 50% duty cycle. As IGBT 417 is switched on, the current provided to the first stage of DC-to-DC converter 415 can rise above the DC offset as shown at graph 440. At a time corresponding to 120 degrees in phase, IGBT 420 can be switched on. In other words, the about 50% duty cycle being applied to IGBT 420 can be time delayed by an amount corresponding to about 120 degrees in phase. In doing so, the time/phase delay can cause the current provided to the second stage of DC-to-DC converter 415 to rise above the DC offset but at about 120 degrees out of phase when compared to the current in the first stage, as shown at graph 441. Similarly, IGBT 423 can be switched on at a time corresponding to about 240 degrees later than when IGBT 417 was switched on and can provide the current response illustrated at 442. In these ways, when the power from the three parallel input stages of DC-to-DC converter 415 are combined, the AC ripple current can be reduced as shown at 443 since the phases of the current at each parallel input stage can relatively offset one another. In an alternate embodiment of the invention, IGBTs 416, 419, and 422 may be switched on during the times their anti-parallel diodes are conducting current, or at other times, to provide additional features and functionality.

For any AC ripple current that may remain, filters 405 and 410 can be employed as part of system 400. Because certain embodiments of the invention can reduce the total AC ripple current existing in system 400, some or all filters employed as part of system 400 can be of a relatively smaller power design to accommodate the smaller AC ripple current. In the exemplary embodiment, filters 405 and 410 are illustrated as capacitors for ushering high frequency currents to a ground, like an earth ground or an AC ground. In other embodiments, it will be appreciated that other filters can be used. Other types of filters include, but are not limited to, the following: a diode; a rectifier, or a passive component.

FIG. 5 illustrates an exemplary method 500 for converting DC power to AC power according to one embodiment of the invention. Method 500 can begin at block 505 where a first DC power signal from a DC power source can be provided to, and received by, a converter, such as DC-to-DC converter 215 in FIG. 2. A DC power source can correspond to any source of DC power. For instance, exemplary DC power sources can include, but are not limited to, a photovoltaic cell, a fuel cell, an array of such cells, a battery, or the like.

Method 500 can continue at block 510 where the first DC power signal provided by the DC power source can be transformed into a plurality of AC power signals. For example, in one embodiment, the DC power signal can be transformed into two AC power signals, like in system 200 where inductors 220 and 225 in combination with DC-to-DC converter 215 can transform the DC power signal from DC power source 205 into the two AC current signals illustrated at 236 and 241. In another embodiment, the DC power signal provided by the DC power source can be transformed into three AC power signals, like in system 300. In other embodiments, the DC power signal provided by the DC power source can be transformed into more than three AC power signals.

At block 515, at least one of the plurality of AC power signals can be shifted by a predetermined phase amount relative to at least one of the other of the plurality of AC power signals. For instance, as was explained in relation to FIG. 2, when the DC power signal is transformed into two AC power signals, the predetermined phase amount can be about 180 degrees. In another embodiment, when the DC power signal is transformed into three AC power signals, the predetermined phase amount can be about 120 degrees. In other embodiments, when the DC power signal is transformed into n AC power signals, the predetermined phase amount can be about 360/n degrees. Whereas in the exemplary embodiments, the predetermined phase amount has been presented as symmetrical, it will be appreciated that in other embodiments, the predetermined phase amount need not be symmetrical.

Method 500 can proceed to block 520 where the phase shifted AC power signal can be combined with at least one of the other of the plurality of AC power signals to provide a second DC power signal. In one embodiment, the phase shifted AC power signal can be combined with at least one of the other of the plurality of AC power signals via electrical coupling to a capacitor bank. In another embodiment, a rectifier circuit can be used. In still other embodiments, other circuits for combining multiple sources of DC power with AC power components can be used.

In some embodiments, once the second DC power signal is generated, the second DC power signal can be conditioned. For example, the second DC power signal can be stabilized and/or regulated to provide a consistent DC power signal at some power level. In some embodiments, a converter such as DC-to-DC converter 215 can be adapted for this purpose. Similarly, as the second DC power signal can be regulated, it can also be boosted from a first voltage to a second voltage, such as with a step up converter or boost converter.

At block 525, method 500 can continue with converting the second DC power signal to an AC power signal, such as with DC-to-AC inverters 250 and 350 in FIG. 2 and FIG. 3 respectively. It will be appreciated that the example elements of FIG. 5 are shown by way of example, and other process embodiments can have fewer or greater numbers of elements, and such elements can be arranged in alternative configurations in accordance with other embodiments of the invention.

In the exemplary embodiment, method 500 can be employed to convert DC power to AC power and to reduce the AC ripple current. While in some embodiments eliminating the AC ripple current completely may be cost prohibitive, it will be appreciated that a relatively smaller AC ripple current can provide certain features. For example, with a relatively smaller AC ripple current, relatively smaller and more economical filtering circuits can be used to reduce the remaining AC ripple current. Enabling more economical designs is at least one technical effect of the invention. Furthermore, a smaller AC ripple current can bolster the efficiency of associated DC power sources since with a constant current draw, there are fewer conductive losses. Increased system efficiency is at least one other technical effect of the invention.

Many modifications and other embodiments of the inventions set forth herein will come to mind to one skilled in the art to which these inventions pertain having the benefit of the teachings presented in the foregoing descriptions and the associated drawings. Thus, it will be appreciated by those of ordinary skill in the art that the invention may be embodied in many forms and should not be limited to the embodiments described above. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for converting direct current (DC) power to alternating current (AC) power, the method comprising: receiving, by a converter, a first DC power signal from at least one DC power source, wherein the converter comprises anti-parallel diodes; transforming the first DC power signal into N of AC power signals; shifting phases of the N AC power signals by about 360/N degrees respectively a predetermined phase amount relative to at least one of the other of the plurality of AC power signals to produce N phase shifted AC power signals; reducing AC ripple current by combining the N phase shifted AC power signals to provide a second DC power signal, wherein the AC ripple current is reduced due to opposing phases of the N phase shifted AC power signals and converting the second DC power signal to an AC power signal.

2. The method of claim 1, wherein the at least one DC power source comprises at least one of the following: a photovoltaic cell, a fuel cell, or a battery.

3. The method of claim 1, wherein converting the second DC power signal comprises: inputting the second DC power signal to a DC-to-AC-inverter; and converting, by the DC-to-AC inverter, the second DC power signal to an AC power signal.

4. The method of claim 3, further comprising: conditioning the second DC power signal prior to providing the second DC power signal to the DC-to-AC inverter.

5. The method of claim 4, wherein conditioning comprises boosting the second DC power signal from a first DC voltage to a second DC voltage.

6. The method of claim 4, wherein conditioning comprises filtering the second DC power signal with a passive component.

7. The method of claim 1, wherein the DC power signal is a DC current from the at least one DC power source.

8. The method of claim 1, wherein the plurality of AC power signals comprises a first AC power signal, a second AC power signal, and a third AC power signal, wherein the second AC power signal is shifted by about 120 degrees from the first AC power signal and the third AC power signal is shifted by about 120 degrees from the second AC power signal, and wherein the first AC power signal, the second phase shifted AC power signal, and the third phase shifted power signal are combined to provide the second DC power signal.

9. The method of claim 1, wherein the plurality of AC power signals comprises n AC power signals, wherein the nth AC power signal is phase shifted (360/n) degrees; and wherein the n phase shifted AC power signals are combined to provide the second DC power signal.

10. A system for converting direct current (DC) power to alternating current (AC) power, the system comprising: at least one DC power source electrically coupled to a converter and operable to provide a first DC power signal to the converter, wherein the converter comprises anti-parallel diodes; at least one controller electrically coupled to the converter and operable to: transform the first DC power signal into plurality N of AC power signals; shift phases of the of N AC power signals by about 360/N degrees respectively a predetermined phase amount relative to at least one of the other of the plurality of AC power signals to produce N phase shifted AC power signals; reduce AC ripple current by combining the N phase shifted AC power signals to provide a second DC power signal, wherein the AC ripple current is reduced due to opposing phases of the N phase shifted AC power signals and convert the second DC power signal to an AC power signal.

11. The system of claim 10, wherein the at least one DC power source comprises at least one of the following: a photovoltaic cell, a fuel cell, or a battery.

12. The system of claim 10, further comprising: at least one DC-to-AC inverter electrically coupled to the converter, wherein the at least one DC-to-AC inverter is operable to receive the second DC power signal from the converter and convert the second DC power signal into an AC power signal.

13. The system of claim 12, wherein the converter is operable to boost the second DC power signal from a first DC voltage to a second DC voltage.

14. The system of claim 12, further comprising a filter electrically coupled to the converter and the DC-to-AC inverter and operable to condition the second DC power signal.

15. The system of claim 14, wherein the filter comprises a passive component.

16. The system of claim 10, wherein the converter comprises three parallel input sections and wherein the controller is operable to: transform the first DC power signal into a first AC power signal, a second AC power signal, and a third AC power signal; shift the second AC power signal by about 120 degrees in relation to the first AC power signal and shift the third AC power signal by about 120 degrees in relation to the second AC power signal; and combine the first AC power signal, the second phase shifted AC power signal, and the third phase shifted AC power signal to provide a second DC power signal.

17. The system of claim 10, wherein the converter comprises n parallel input sections, and wherein the controller is operable to: transform the first DC power signal into n AC power signals; shift the nth AC power signal by (360/n) degrees; and combine the n phase shifted AC power signals to provide a second DC power signal.

18. An apparatus for converting direct current (DC) power to alternating current (AC) power, the apparatus comprising: at least one inductor electrically coupled to a converter, wherein the inductor is operable to receive a first DC power signal, wherein the converter comprises anti-parallel diodes; at least one switching component electrically coupled to the at least one inductor; and a controller electrically coupled to the at least one switching component and the converter and operable to: transform a first DC power signal into of N AC power signals; shift, via the at least one switching component, phases of the of N AC power signals by about 360/N degrees respectively a predetermined phase amount to produce N phase shifted AC power signals; reduce AC ripple current by combining the N phase shifted AC power signals to provide a second DC power signal, wherein the AC ripple current is reduced due to opposing phases of the N phase shifted AC power signals and convert the second DC power signal to an AC power signal.

19. The apparatus of claim 18, wherein the switching component comprises at least one of the following: an insulated gate bipolar transistor, a MOSFET, a bipolar junction transistor, a thyristor, or a semiconductor switch.

20. The apparatus of claim 18, further comprising at least one component electrically coupled to the converter and operable to condition the second DC power signal, wherein the at least one component comprises at least one of the following: a passive component, a diode, or a rectifier.

* * * * *

UNITED STATES PATENT AND TRADEMARK OFFICE
CERTIFICATE OF CORRECTION

PATENT NO. : 8,576,598 B2  Page 1 of 1
APPLICATION NO. : 12/505802
DATED : November 5, 2013
INVENTOR(S) : Robert Gregory Wagoner et al.

It is certified that error appears in the above-identified patent and that said Letters Patent is hereby corrected as shown below:

In the Claims

Column 9, line 11 (claim 10, line 8) please change "of the of N AC" to -- of the N AC --

Column 10, line 22 (claim 18, line 9) please change "into of N AC" to -- into N AC --

Column 10, line 24 (claim 18, line 11) please change "of the of N AC" to -- of the N AC --

Signed and Sealed this
Eighteenth Day of February, 2014

Michelle K. Lee
*Deputy Director of the United States Patent and Trademark Office*